(12) United States Patent
Narayanan et al.

(10) Patent No.: US 9,929,587 B2
(45) Date of Patent: Mar. 27, 2018

(54) RADIO FREQUENCY ENERGY HARVESTING SYSTEM

(71) Applicant: THE BOEING COMPANY, Chicago, IL (US)

(72) Inventors: Authi A. Narayanan, Thousand Oaks, CA (US); Alan R. Keith, Yorba Linda, CA (US)

(73) Assignee: The Boeing Company, Chicago, IL (US)

( * ) Notice: Subject to any disclaimer, the term of this patent is extended or adjusted under 35 U.S.C. 154(b) by 146 days.

(21) Appl. No.: 15/055,286

(22) Filed: Feb. 26, 2016

(65) Prior Publication Data
US 2017/0250559 A1    Aug. 31, 2017

(51) Int. Cl.
| | |
|---|---|
| H02J 17/00 | (2006.01) |
| H02J 7/02 | (2016.01) |
| H01Q 3/02 | (2006.01) |
| H01Q 21/06 | (2006.01) |
| H02J 50/23 | (2016.01) |
| H02J 50/27 | (2016.01) |

(52) U.S. Cl.
CPC ............. *H02J 7/025* (2013.01); *H01Q 3/02* (2013.01); *H01Q 21/06* (2013.01); *H02J 50/23* (2016.02); *H02J 50/27* (2016.02)

(58) Field of Classification Search
CPC ............. H02J 50/20; H02J 50/23; H02J 50/27
See application file for complete search history.

(56) References Cited

U.S. PATENT DOCUMENTS

| | | | |
|---|---|---|---|
| 7,307,589 B1 | 12/2007 | Gregoire et al. | |
| 8,879,995 B2 * | 11/2014 | Viglione | H04B 5/0037 455/127.1 |
| 2011/0080135 A1 | 4/2011 | Bland | |
| 2015/0311461 A1 | 10/2015 | Cola et al. | |

FOREIGN PATENT DOCUMENTS

EP          2 282590 A2    2/2011

OTHER PUBLICATIONS

A. Seabaugh, R. Lake, "Tunneling Diodes", Encyclopedia of Applied Physics, vol. 22, 1998, pp. 335-359, Wiley-VCH Verlag GmbH, 3-527-29475-9.

(Continued)

*Primary Examiner* — Jeffrey Zweizig
(74) *Attorney, Agent, or Firm* — Francisco A. Rubio-Campos; Apogee Law Group P.C.

(57) ABSTRACT

Disclosed is a Radio Frequency ("RF") Energy Harvesting System ("RFHS"). The RFHS includes a phased array antenna, a power harvesting unit, and a controller. The phased array antenna is configured to receive ambient RF energy and, in response, produce an input power signal. The power harvesting unit is in signal communication with the phased array antenna and includes a rectifier module, storage module, and power threshold module. The power harvesting unit is configured to receive the input power signal and, in response, produce a rectified power signal. The controller is in signal communication with the phased array antenna and may steer the antenna beam of the phased array antenna.

20 Claims, 9 Drawing Sheets

(56) References Cited

OTHER PUBLICATIONS

Jian Ping Sun, George I. Haddad, Pinaki Mazumder, Joel N. Schulman, "Resonant Tunneling Diodes: Models and Properties", Proceedings of the IEEE, vol. 86, No. 4, Apr. 1998.
"Quantum Tunnelling", Wikipedia, https://en.wikipedia.org/wiki/Quantum_tunnelling.
"Quantum Theory and the Uncertainty Principle", The Physics of the Universe, http://www.physicsoftheuniverse.com/topics_quantum_uncertainty.html.
"Rectenna", Wikipedia, https://en.wikipedia.org/wiki/Rectenna.
"Solar Wind", Wikipedia, https://en.wikipecha.org/wiki/Solar_wind.
"Tunnel Diode", Wikipedia, https://en.wikipedia.org/wiki/Tunnel_diode.
European Patent Office Extended European Search Report, Application No. 17156370.3-1804, dated Jul. 5, 2017.

\* cited by examiner

RADIO FREQUENCY ENERGY HARVESTING SYSTEM

BACKGROUND

1. Field

The present disclosure relates to rectifying antennas ("rectennas"), and more, particularly to a rectenna array for harvesting radio frequency ("RF") energy.

2. Related Art

Rectennas are known in the art. A rectenna is a rectifying antenna, which is a type of antenna that is utilized to convert ambient electromagnetic energy that impinges on the rectenna into direct current ("DC") electricity. An example of a simple rectenna element includes a dipole antenna with a radio frequency ("RF") diode connected across the dipole antenna terminals. In an example of operation, the dipole antenna receives the ambient electromagnetic energy that impinges on the dipole antenna. The ambient electromagnetic energy then induces an alternating current ("AC current") on the dipole antenna that is passed to the RF diode. The RF diode then rectifies the AC current induced on the dipole antenna to produce a DC current. The DC current then powers a load connected across the RF diode terminals. In general, an example of an RF diode for a rectenna is a Schottky diode because Schottky diodes have low voltage drops and high speed electrical characteristics that result in low power losses due to the conduction of the AC and DC currents and the switching of the diode.

Commercially available diodes such as, for example, P-N junction, PIN, and Schottky diodes all have turn-on voltages that are higher than 0.30 to 0.40 volts. Unfortunately, these turn-on voltages are too high to convert most of the energy captured by the rectenna in an environment where the impinging ambient electromagnetic energy is low residual, or ultra-low residual, RF energy, which is too low to induce a current capable of producing a voltage that is high enough to turn-on the diode. In this situation, if the power of the impinging ambient electromagnetic energy is too low to produce a voltage that is high enough to turn-on the diode, the captured impinging ambient electromagnetic energy is wasted as heat.

Unfortunately, this results in wasted energy that could be used to power modern near-zero energy consuming ("NZero") sensors. At present, a number of NZero sensors have been developed for various wireless sensor networks. These NZero sensors monitor various parameters for aerospace vehicles, health monitoring systems, and data collection systems. Additionally, in the example of aerospace vehicles, these NZero sensors may be located in areas of an aerospace vehicle that are either not accessible or not easily accessible. Moreover, the location of these NZero sensors and the total number of NZero sensors (which may be in the thousands) on the aerospace vehicle may be limited by the ability to connect the NZero sensor to physical electrical wires based on both the total weight of the wires and the required wiring paths along the aerospace vehicle, which may be an aircraft or space vehicle. As such, there is a need for a wireless high efficiency RF energy rectifying system capable of operating in residual low or ultra-low residual low RF energy environment.

SUMMARY

Disclosed is a Radio Frequency ("RF") Energy Harvesting System ("RFHS"). The RFHS includes a phased array antenna, a power harvesting unit ("PHU"), and a controller. The phased array antenna is in signal communication with both the PHU and controller. The controller is also in signal communication with the PHU. The phased array antenna is configured to receive ambient RF energy and, in response, produce an input power signal. The PHU includes a rectifier module and storage module. The rectifier module is in signal communication with the phased array antenna and storage module. The PHU is configured to receive the input power signal and, in response, produce a rectified power signal. The controller is configured to steer an antenna beam of the phased array antenna to increase the received ambient RF energy. In general, by steering the antenna beam, the RFHS is configured to capture the ambient RF energy available from different directions by maximizing the collection efficiency with the utilization of phased array antenna with minimum energy use for tuning.

As an example of operation, the RFHS performs a method for harvesting the ambient RF energy. The method includes receiving ambient RF energy with the phased array antenna, producing an input power signal with the phased array antenna array in response to receiving the ambient RF energy, rectifying the input power signal with the rectifier module to produce the rectified power signal, and storing the rectified power signal in the storage module to create a corresponding amount of stored electrical potential energy within the storage module. The process then determines whether the amount of stored electrical potential energy within the storage module is greater than a predetermined threshold value with the power threshold module and transmits the stored rectified power signal to a sensor, if the amount of stored electrical potential energy within the storage module is greater than or equal to the predetermined threshold value.

Additionally disclosed is another example of an implementation of the RFHS utilizing at least two quantum tunnel diodes. In this example, the RFHS includes the phased array antenna, which is configured to receive the ambient RF energy and, in response, produce the input power signal and the at least two quantum tunnel diodes, which are in signal communication with the phased array antenna. The at least two quantum tunnel diodes are configured to receive the input power signal and, in response, produce the rectified power signal.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

A radio frequency ("RF") energy harvesting system ("RFHS") is disclosed for high-efficiency phased array RF energy harvesting and transfer. The RFHS includes a phased array antenna, a power harvesting unit ("PHU"), and a controller. The phased array antenna is in signal communication with both the PHU and controller. The controller is also in signal communication with the PHU. The phased array antenna is configured to receive ambient RF energy and, in response, produce an input power signal. The PHU includes a rectifier module and storage module. The rectifier module is in signal communication with the phased array antenna and storage module. The PHU is configured to receive the input power signal and, in response, produce a rectified power signal. The controller is configured to steer an antenna beam of the phased array antenna to increase the received ambient RF energy. In general, by steering the antenna beam, the RFHS is configured to capture the ambient RF energy available from different directions by maximizing the collection efficiency with the utilization of phased array antenna with minimum energy use for tuning.

Additionally disclosed is another example of an implementation of the RFHS utilizing at least two quantum tunnel diodes. In this example, the RFHS includes the phased array antenna, which is configured to receive the ambient RF energy and, in response, produce the input power signal and the at least two quantum tunnel diodes, which are in signal communication with the phased array antenna. The at least two quantum tunnel diodes are configured to receive the input power signal and, in response, produce the rectified power signal.

As an example of operation, the RFHS performs a method for harvesting the ambient RF energy. The method includes receiving ambient RF energy with the phased array antenna, producing an input power signal with the phased array antenna array in response to receiving the ambient RF energy, rectifying the input power signal with the rectifier module to produce the rectified power signal, and storing the rectified power signal in the storage module to create a corresponding amount of stored electrical potential energy within the storage module. The process then determines whether the amount of stored electrical potential energy within the storage module is greater than a predetermined threshold value with the power threshold module and transmits the stored rectified power signal to a sensor, if the amount of stored electrical potential energy within the storage module is greater than or equal to the predetermined threshold value.

Figure 1:
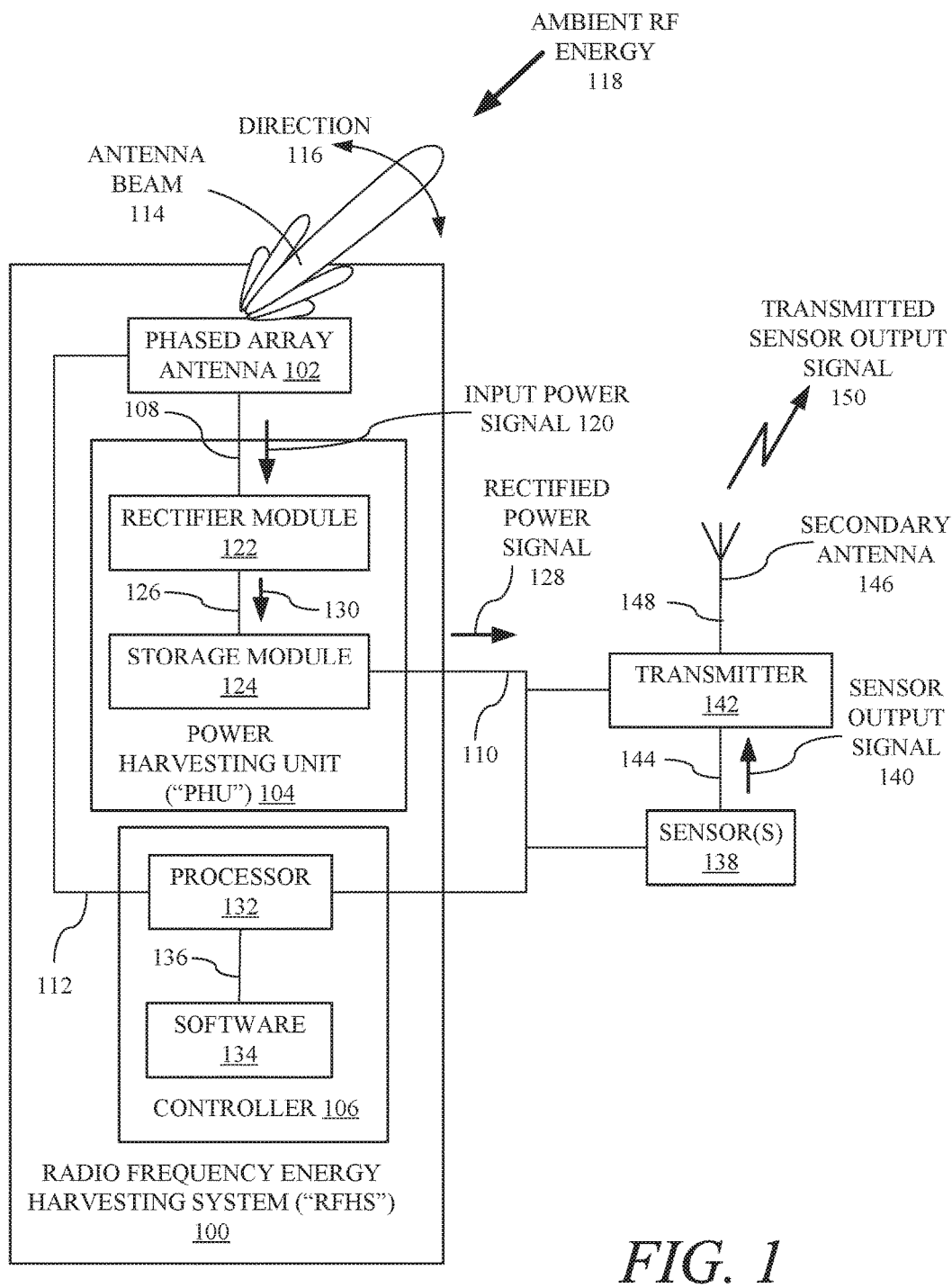
FIG. 1 is a system block diagram of an example of an implementation of a radio frequency ("RF") energy harvesting system ("RFHS") in accordance with the present disclosure.

In FIG. 1, a system block diagram of an example of an implementation of a radio frequency ("RF") energy harvesting system ("RFHS") 100 for a high-efficiency phase array RF energy harvesting and transfer is shown in accordance with the present disclosure. The RFHS 100 includes a phased array antenna 102, a power harvesting unit ("PHU") 104, and a controller 106. In this example, the PHU 104 is in signal communication with both the phased array antenna 102 and the controller 106 via signal paths 108 and 110, respectively. Furthermore, the controller 106 is also in signal communication with the phased array antenna 102 via signal path 112.

The phased array antenna 102 includes a plurality of antenna elements (not shown), phase shifters (not shown), and a combiner network (not shown) that are configured to form an antenna beam 114 from the combined radiation patterns of the plurality of antenna elements of the phased array antenna 102. In this example, each individual phase shifter of the plurality of phase shifters is in signal communication with a corresponding individual antenna element of the plurality of antenna elements. The plurality of phase shifters are configured to direct (i.e., steer) the antenna beam of the phased array antenna 102 in a direction 116 based on the relative phases that the individual phase shifters, of the plurality of phase shifters, inject on to the corresponding individual antenna elements of the plurality of antenna elements. The phased array antenna 102 is configured to receive ambient RF energy 118 that impinges on the surface of the phased array antenna 102 and, in response, produces an input power signal 120 that is passed to the PHU 104 via signal path 108. In general, the phased array antenna 102 is designed to receive the ambient RF energy 118 based on predetermined design that is tuned to certain RF frequency bands.

In this example, the phased array antenna 102 may be configured to perform in an autonomous search mode so as to maximize the amount of energy harvested from the ambient RF energy 118 that impinges on the surface of the phased array antenna 102. In order to achieve efficiency optimization, each phase shifter of the plurality of phase shifters may be a low-power phase shifter that holds a setting without power dissipation. As an example of a simplified implementation, the phased array antenna 102 may be a three (3) antenna element by three (3) antenna element phased array antenna with nine (9) total antenna elements, where each antenna element includes a radiating antenna (not shown), and phase shifter (not shown) connected to a combiner network (not shown) that is in signal communication with the PHU 104.

The PHU 104 includes a rectifier module 122 and a storage module 124, which are in signal communication via signal path 126. In operation, the PHU 104 is configured to receive the input power signal 120 and, in response, produce a rectified power signal 128 that is passed to other devices, module, circuits, or components via signal path 110. The rectifier module 122 is generally a combination of at least two low-power diodes such as, for example, two Schottky diodes, two tunnel diodes, or two quantum tunnel diodes. In this example, utilizing at least two quantum tunnel diodes allows the RFHS 100 to receive ultra-low level ambient RF energy 118 and still produce a rectified power signal 128. In this example, ultra-low level is in the sub-millivolt region since the turn-on voltage for quantum tunnel diodes are also in the sub-millivolt region unlike Schottky diodes that have turn-on voltages from 0.4 volts to 0.5 volts.

In operation, the rectifier module 122 receives the input power signal 120 and rectifies it to produce an internal rectified power signal 130 that is passed to the storage module 124 via signal path 126. The storage module 124 may be a low-power chargeable battery or capacitor configured to store the internal rectified power signal 130 (which is produced by the rectifier module 122) and output the rectified power signal 128, which is produced by the stored energy within the storage module 124 from the stored internal rectified power signal 130.

The controller 106 includes a processor 132 and a software module 134 that is in signal communication with the processor 132 via signal path 136. The processor 132 may be any low-power processor, digital signal processor ("DSP"), application specific integrated circuit ("ASIC"), field-programmable gate array ("FPGA"), microcontroller, or other similar device. In operation, the controller 106 receives a portion of the rectified power signal 128 (via signal path 110) and utilizes that portion of the rectified power signal 128 to power the controller 106, including the processor 132 and software module 134. The processor 132 then controls the directional beam steering 116 of the antenna beam 114 of the phased array antenna 102. In general, the processor 132 is configured to steer the antenna beam 114 in the direction 116 that increases and preferably maximizes and/or optimizes the reception of the ambient RF energy 118. The processor 132 performs the steering by controlling the phase states of the individual phase shifters within the phased array antenna 102. In general, the processor 132 utilizes software that is stored in the software module 134 to perform the necessary operations to control the phased array antenna 102 and steer the resulting antenna beam 114 in a given direction 116. The controller 106 may also monitor the amount of power being produced by the PHU 104 (either the rectifier module 122, via the internal rectified power signal 130, and/or the storage module 124, via the rectified power signal 128) to determine if the direction 116 of the antenna beam 114 is receiving enough power from the ambient RF energy 118. If it is not, the controller 106 may then initiate a change of phases of the plurality of phase shifters in the phased array antenna 102 so as to shift (i.e., steer) the direction 116 of the antenna beam 114 to better receive the available ambient RF energy 118.

In operation, the controller 106 may continuously perform a process of monitoring the power produced by the PHU 104 and steering the direction 116 of the antenna beam 114, of the phased array antenna 102, to increase the amount of power produced by the PHU 104 by increasing the amount of received ambient RF energy 118—i.e., the controller 106 may steer the antenna beam 114 in a directions 116 towards a radiating source (not shown) producing the ambient RF energy 118 so as to maximize the power captured by the phased array antenna 102. The controller 106 may utilize a power threshold module (not shown) to monitor the power produced by the PHU 104. In this example, the storage module 134 may be a low-power storage and/or memory unit configured to store any needed software code for the processor 132.

In an example of operation, the RFHS 100 may be utilized to power one, or more, sensors 138 that are in signal communication with the PHU 104 via signal path 110. These sensors 138 may be near-zero energy consuming ("NZero") sensors configured to monitor various parameters for aerospace vehicles, health monitoring systems, and data collection systems. The PHU 104 powers the sensors 138 by transmitting a portion of the rectified power signal 128 to the sensors 138 via signal path 110. The sensors 138 are one or more devices (usually a transducer) that detect events or changes in their environment and then provide a corresponding sensor output signal 140. In this example, the sensors 138 may be in signal communication with a transmitter 142, via signal path 144, and the transmitter 142 may be in signal communication with both the PHU 104 and a secondary antenna 146 via signal paths 110 and 148, respectively. The sensors 138 pass the sensor output signal 140 to the transmitter 142 (via signal path 144) and the transmitter 142 then transmits the sensor output signal 140 as a transmitted sensor output signal 150 via the secondary antenna 146. The transmitted sensor output signal 150 may be transmitted to a remote monitoring system (not shown) that is configured to monitor the sensor output signal(s) 140 from the sensors 138. In this example, the transmitter 142 is powered by receiving a portion of the rectified power signal 128 via signal path 110. The sensors 138 and transmitter 142 may be optionally part of the RFHS 100.

The circuits, components, modules, and/or devices of, or associated with, the RFHS 100 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

Figure 2:
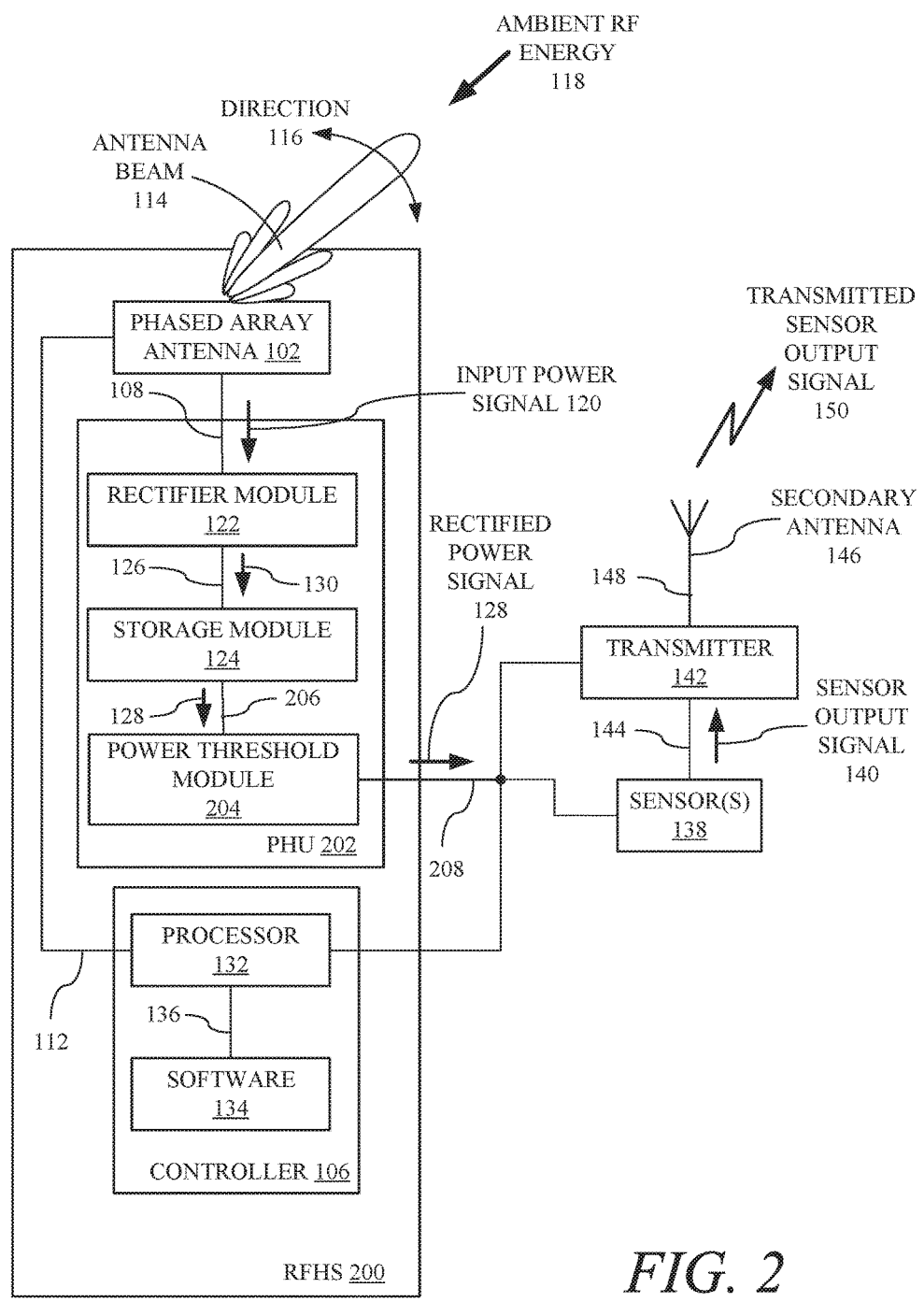
FIG. 2 is a system block diagram of an example of another implementation of a RFHS in accordance with the present disclosure.

In FIG. 2, a system block diagram of an example of another implementation of a RFHS 200 is shown in accordance with the present disclosure. Similar to the example of the RFHS 100 shown in FIG. 1, in this example the RFHS 200 also includes the phased array antenna 102, a PHU 202, and controller 106. However, unlike the PHU 104 shown in FIG. 1, in this example the PHU 202 includes the rectifier module 122, storage 124, and a power threshold module 204. In this example, the power threshold module 204 is in signal communication with the storage module 124 via signal path 206. Additionally, the power threshold module 204 is also in signal communication with the processor 132, sensors 138, and transmitter 142 via signal path 208. In general, the RFHS 200 operates in the same fashion as the RFHS 100 shown in FIG. 1, except that in this example, the power threshold module 204 is configured to monitor the amount of stored energy in the storage module 124 before allowing the PHU 202 to output the rectified power signal 128. In an example of operation, the power threshold module 204 may continuously monitor the amount of stored energy in the storage module 124 by comparing, for example, the voltage magnitude of the rectified power signal 128 produced by the storage module 124, against a predetermined voltage threshold value. An example of the predetermined voltage threshold value may be 3.6 volts. If the voltage magnitude of the rectified power signal 128 is greater than the predetermined voltage threshold, the power threshold module passes the rectified power signal 128 to signal path 208 so as to power the processor 132, sensors 138, and transmitter 142. If, instead, the voltage magnitude of the rectified power signal 128 is less than or equal to the predetermined voltage threshold, the power threshold module 204 does not allow the rectified power signal 128 of the storage module 124 to be output by the PHU 202. In this way, the power threshold module 204 allows the storage module 124 to charge to a proper energy level before the storage module 124 is allowed to be discharged to power devices external to the PHU 202. Once the storage module 124 reaches a predetermined level of stored energy that is proportional to the predetermined voltage threshold, the power threshold module 204 allows the storage module 124 to be discharged via the rectified power signal 128.

It is appreciated by those of ordinary skill in the art that the storage module 124 allows storage of energy produced by the internal rectified power signal 130 from the rectifier module 122. As such, if the phased array antenna 102 is continuously receiving sufficient ambient RF energy 118 to charge the storage module 124 sufficiently to produce a rectified power signal 128 that has a voltage magnitude that is greater than the predetermined voltage threshold, the power threshold module 204 will pass the continuous rectified power signal 128 to the signal path 208. In this example, the power threshold module 204 will stop passing the continuous rectified power signal 128 to the signal path 208 when the power level of the internal rectified power signal 130 drops below a level that is capable of sufficiently charging the storage module 124.

As an alternative implementation, the power threshold module 204 may be part of the controller 106. In this alternative example, the processor 132 is configured to continuously monitor the amount of stored energy in the storage module 124 by comparing, for example, the voltage magnitude of the rectified power signal 128 (produced by the storage module 124) against the predetermined voltage threshold value. In this example, the PHU 202 may include a switch (not shown) that is controlled by the processor 132, where the switch is configured to allow passage of the rectified power signal 128 to the signal path 208, if the processor 132 determines that the voltage magnitude of the rectified power signal 128 produced by the storage module 124 is greater than the predetermined voltage threshold value. In this example, the sensors 138 and transmitter 142 may be optionally part of the RFHS 200.

Figure 3:
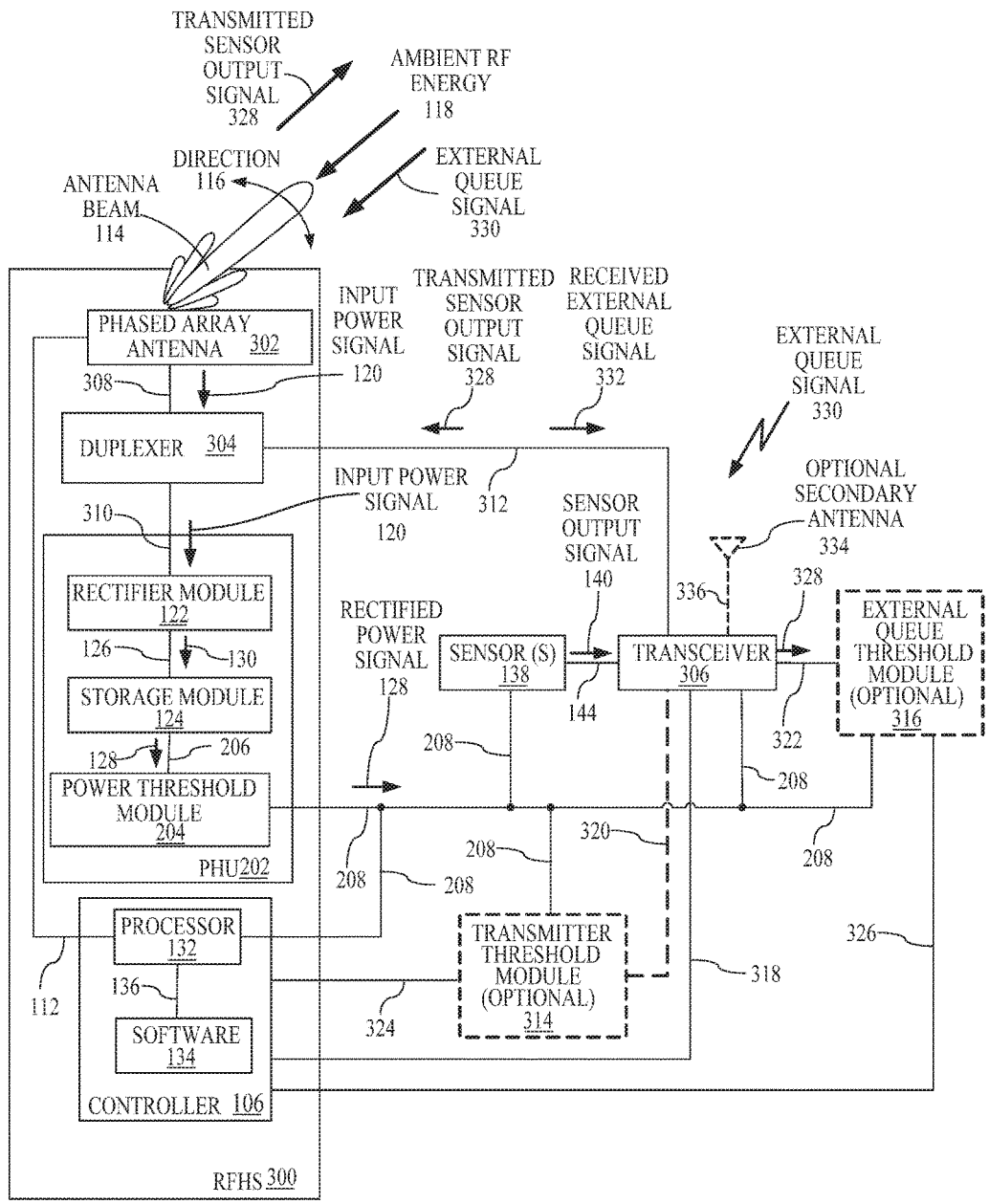
FIG. 3 is a system block diagram of an example of yet another implementation of a RFHS in accordance with the present disclosure.

In FIG. 3, a system block diagram of an example of yet another implementation of a RFHS 300 is shown in accordance with the present disclosure. Unlike the examples shown in FIGS. 1 and 2, in FIG. 3, the RFHS 300 includes a bi-directional phased array antenna 302 and a duplexer 304. Moreover, the RFHS 300 is configured to operate with a transceiver 306. Similar to the RFHS 200 shown in FIG. 2, the RFHS 300 also includes the PHU 202 and controller 106, where the PHU 202 includes the rectifier module 122, storage module 124, and power threshold module 204 and the controller 106 includes the processor 132 and software module 134.

The duplexer 304 is in signal communication with phased array antenna 302, rectifier module 122, and transceiver 306 via signal paths 308, 310, and 312. In this example, the duplexer 304 is an electronic device that allows bi-directional ("duplex") communication over a single path (i.e., signal path 308 with the phased array antenna 302). It is appreciated by those of ordinary skill in the art that in radar and radio communication systems, the duplexer 304 isolates the PHU 202 from the transceiver 306 while permitting both to share the phased array antenna 302 as a common antenna. Common types of duplexers include, for example, a transmit-receive switch, circulator, orthomode transducer, or frequency domain filter.

In this example, unlike the examples shown in FIGS. 1 and 2, the transceiver 306 is shown instead of the transmitter 142. The transceiver 306 is a device that includes both a combined transmitter and receiver that share common circuitry or a single housing. Similar to the example shown in FIG. 2, the transceiver 306 is in signal communication with the power threshold module 204 via signal path 208. The transceiver 306 is in signal communication with the duplexer 304, power threshold module 204, the sensors 138, the controller 106, an optional transmitter threshold module 314, and an optional external queue threshold module 316 via signal paths 312, 208, 144, 318, 320, and 322 respectively.

The RFHS 300 may also be in signal communication with optional threshold module 314 and external queue threshold module 316 via signal paths 208, 324, and 326, respectively, where signal path 208 is in signal communication with the power threshold module 204 and signal paths 324 and 326 are in signal communication with the controller 106. In this example, the optional threshold module 314 may be a device similar to the power threshold module 204 that is configured to monitor the amount of stored energy in the storage module 124 before allowing the transceiver 306 to transmit the sensor output signal 140 as a transmitted sensor output signal 328 via the antenna beam 114, which is passed to the phased array antenna 302 for transmission to a remote monitoring system (not shown) that is configured to monitor the sensor output signal(s) 140 from the sensors 138. In this example, the phased array antenna 302 may be configured (i.e., tuned) to operate at two or more different frequency bands so as to allow the transmission of the transmitted sensor output signal 328 at a different frequency band than the received ambient RF energy 118. Additionally, the phased array antenna 302 may be configured to receive a third frequency band so as to receive an external queue signal 330 from the remote monitoring system (not shown).

The optional external queue threshold module 316 may be a device similar to the power threshold module 204 and optional transmitter threshold module 314 in that it may include some type of threshold hold device. In this example, the optional external queue threshold module 316 is configured to monitor the transceiver 306 to determine if a received external queue signal 332 has been received by the transceiver 306. If the optional external queue threshold module 316 determines that the transceiver 306 has received the received external queue signal 332, the optional external queue threshold module 316 may then inform the controller 106 that a queue signal has been sent from the remote monitoring system (not shown) and the controller 106 may then act accordingly to control the RFHS 300. The transceiver 306 may also be in signal communication with an optional second antenna 334 (via signal path 336) that is configured to receive the external queue signal 330. The optional second antenna 334 that may be utilized in the phased array antenna 302 is not configured to receive a frequency band corresponding to the external queue signal 330. In this example, the optional second antenna 334 may be a simple low power passive antenna that is tuned to receive the external queue signal 330 and pass the received external queue signal to the transceiver 336.

In an example of operation, the RFHS 300 receives the ambient RF energy 118, with the phased array antenna 302, which results in the input power signal 120. The rectifier module 122 then rectifies the input power signal 120 to produce the internal rectified power signal 130 that is utilized by the RFHS 300 to charge the storage module 124. The power threshold module 204 then monitors the amount of charged energy in the storage module 124 and determines if there is enough stored energy in the storage module 124 to power the controller 106, power the sensors 130, transceiver 306, optional threshold module 314, and optional external queue threshold module 316. If there enough stored energy in the storage module 124, the power threshold module 204 then allows the storage module 124 to power the controller 106, power the sensors 130, transceiver 306, optional threshold module 314, and optional external queue threshold module 316 with the rectified power signal 128 via signal path 208. Once the sensors 138 are powered up by the rectified power signal 128, the sensors 138 may begin to measure environmental data that may be passed to the transceiver 306 as one or more sensor signals 140 via signal path 144. Once the sensor signals 140 are received by the transceiver 306, the transceiver 306 may transmit the sensor output signal 140 as transmitted sensor output signal 328 that is passed to and transmitted by the phased array antenna 302 to the remote monitoring system. Alternatively, if the optional external queue threshold module 316 is present, the optional external queue threshold module 316 may prevent the transceiver 306 from transmitting the received sensor output signal 140 until the transceiver 306 first receives the received external queue signal 332 (from the phased array antenna 302 via signal path 312) or the external queue signal 330 (from the optional secondary antenna 334 via signal path 336). In this example, the optional external queue threshold module 316 may be utilized by the controller 106 to in managing energy efficiency of the RHFS 300 because by limiting the actual transmissions performed by the transceiver 306, the controller 106 is capable of limiting the power draw on the storage module 124 to situations where the remote monitoring system (not shown) is actually requesting sensor 138 information via the external queue signal 330. For similarly related power optimization reasons, the optional transmitter threshold module 314 may prevent the transceiver 306 from transmitting the sensor output signal 140 to situations where the received rectified power signal 128 is about another predetermined threshold value that insures that there is enough power in the storage module 124 to properly power the transceiver 306 when the transceiver 306 is transmitting the sensor output signal 140. It is appreciated by those of ordinary skill in the art that the optional transmitter threshold module 314, optional external queue threshold module 316, or both may be optionally part of the controller 106.

Figure 4:
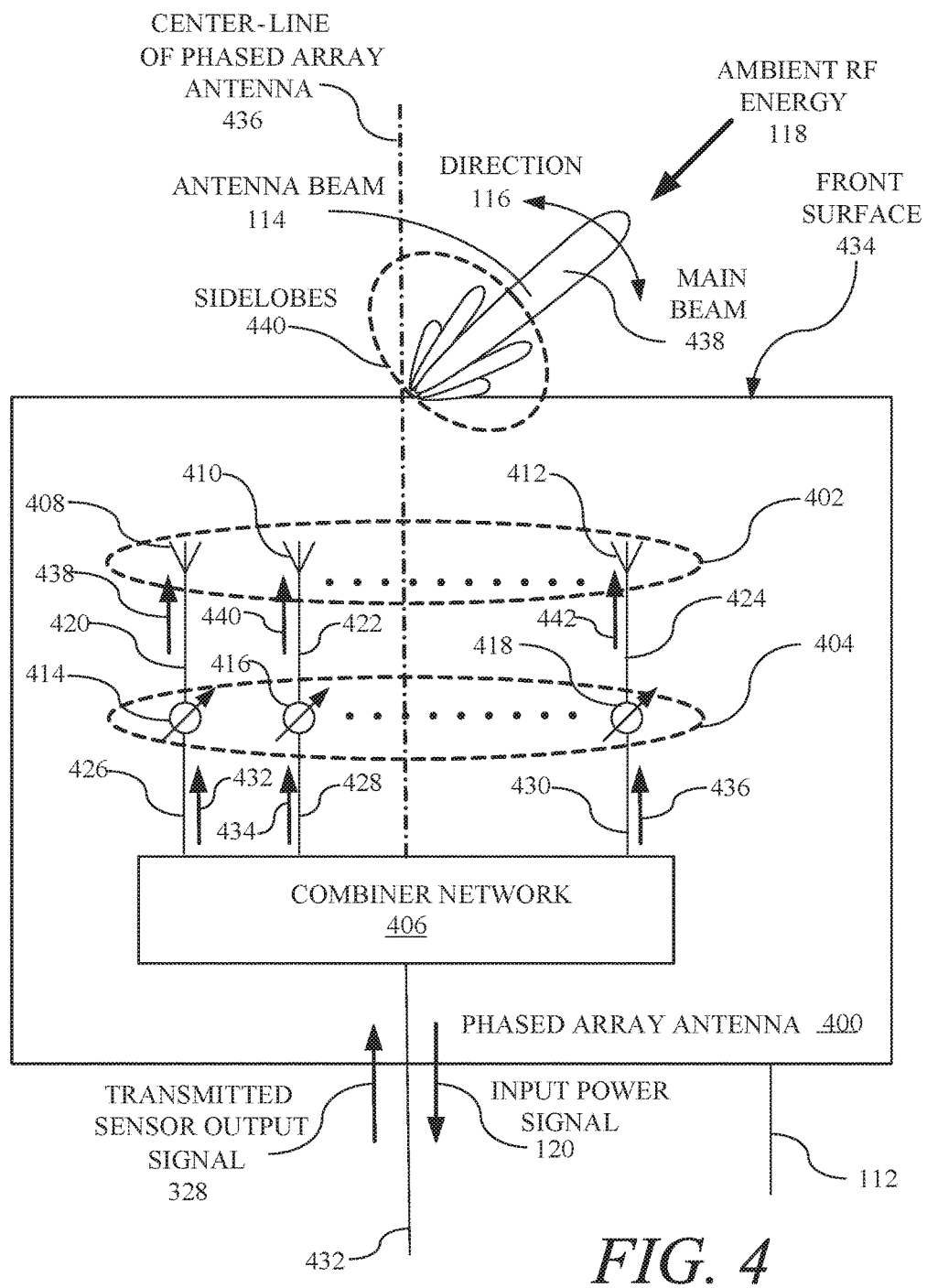
FIG. 4 is a system block diagram of an example of an implementation of the phased array antenna, shown in FIGS. 1 through 3, in accordance with the present disclosure.

Turning to FIG. 4, a system block diagram of an example of an implementation of the phased array antenna 400 is shown in accordance with the present disclosure. The phased array antenna 400 may include a plurality of antenna elements 402, a plurality of phase shifters 404, and a combiner network 406. In this example, three (3) antenna elements 408, 410, and 412 and three (3) phase shifters 414, 416, and 418 are shown in signal communication with each other via corresponding signal paths 420, 422, and 424, respectively. The phase shifters 414, 416, and 418 are in signal communication with the combiner network 406 via signal paths 426, 428, and 430, respectively. The combiner network 406 is in signal communication with the rectifier module 122 or duplexer 304 via signal path 432. In this example, the signal path 432 is the same as signal path 108 if no duplexer 304 is present (as shown in FIG. 2) or signal path 308 if the duplexer 304 is present as shown in FIG. 3.

The combiner network 406 is a power distribution network (such as, for example, a corporate feed network) that combines a signal (such as ambient RF energy 118) received by the plurality of antenna elements 408, 410, and 412. In an example of operation, the amount of received ambient RF energy 118 by the phased array antenna 400 is determined by the antenna beam 114 formed by the radiation pattern of the phased array antenna 400. The radiation pattern (that corresponds to the antenna beam 114) of the phased array antenna 400 is the result of the number of antenna elements 408, 410, and 412, their respective physical positioning on a front surface 434 of the phased array antenna 400, the physical spacing (not shown) between individual adjacent antenna elements 408, 410, and 412, the individual phase values of the individual phase shifters 414, 416, and 418, and the configured power distribution of the different internal signal paths through the combiner network 406 to the plurality of signal paths 426, 428, and 430 to the respective plurality of phase shifters 414, 416, and 418. In general, the combiner network 406 may introduce a power amplitude taper across the plurality of antenna elements 408, 410, and 412, where the excitation amplitudes of the antenna elements 408, 410, and 412 generally decrease with the distance from a center-line 436 of the phased array antenna 400. Moreover, the radiation pattern that creates the antenna beam 114 has a direction 116 of the antenna beam 114 that is determined by the respective phase shift values of the plurality of phase shifters 414, 416, and 418. As an example, as the controller 106 changes the values of the plurality of the phase shifters 414, 416, and 418, the resulting radiation pattern changes such that the antenna beam is steered in the in three dimensional space in the direction 116.

It is noted that in this example, only three (3) sets of antenna elements 408, 410, and 412 and phase shifters 414, 416, and 418 are shown in a one-dimensional equal spaced linear fashion for the purpose of ease of illustration. It is appreciated by those of ordinary skill in the art that the phase array antenna 400 may include a one, two, or three-dimensional array of antenna elements 408, 410, and 412 spaced equally or non-equally along the front surface 434 of the phased array antenna 400 based on the desired radiation pattern of the phased array antenna 400. As such, the number of antenna elements 408, 410, and 412 may be as low as two (2) or as high as necessary (i.e., more than 3) to properly receive the desired amount of ambient RF energy 118, taking into account the power handling capability of the phase array antenna 400 and RFHS (100, 200, or 300), the size of the RFHS (100, 200, or 300), and desired radiation pattern that results in an antenna beam 114 that includes a relatively narrow beam-width main beam 438 and relatively low sidelobes 440. The controller 106 then steers the antenna beam 114 in a direction 116 that is towards a radiating source (not shown) to maximize the power captured from the ambient RF energy 118 produced by the source.

If the phased array antenna 400 is a bi-direction device, the combiner network 406 is also configured to receive a signal to be transmitted (such as, for example, the transmitted sensor output signal 328) and divide the transmitted sensor output signal 328 into a plurality of component power signals 432, 434, and 436 that are passed to the plurality of phase shifters 414, 416, and 418, respectively, which are then phase shifted into a plurality of phase shifted component power signals 438, 440, and 442 and passed to the plurality of antenna elements 408, 410, and 412, respectively. The transmitted plurality of phase shifted component power signals 438, 440, and 442 form a radiation pattern that creates the antenna beam 114 where, again, the direction 116 of the antenna beam 114 is determined by the respective phase shift values of the plurality of phase shifters 414, 416, and 418.

The phase shifters 414, 416, and 418 may be RF, microwave, or millimeter wave network components that provide controllable phase shift (i.e., a transmission phase angle) of either the received ambient RF energy signal 118 or the transmitted sensor output signal 328. In this example, the phase shifters 414, 416, and 418 may be reciprocal phase shifters that have low insertion loss and equal amplitude (or loss) in all phase states. The phase shifters 414, 416, and 418 may be controlled electrically, magnetically, or mechanically. Moreover, the phase shifters 414, 416, and 418 may be analog or digital phase shifters. Analog phase shifters may provide continuous variable phase controlled by a voltage signal and may be implemented utilizing varactor diodes that change capacitance with voltage or nonlinear dielectrics such as barium strontium titanate or ferro-electric material such as yttrium iron garnet. Mechanically controlled phase shifters may utilize lengthened transmission lines such as a trombone line. In this example, the controller 106 is configured to control the phase shifter 414, 416, and 418 via signal path 112. The antenna elements 408, 410, and 412 may be, for example, dipole antenna elements or patch antennas.

It is also appreciated by those of ordinary skill in the art that the phase array antenna 400 may include multiple sets of antenna elements, phase shifters, and combiner networks such that the phased array antenna 400 may actually be composed of multiple phase array antennas (not shown). In this example, each phase array antenna (now shown) within the combined phased array antenna 400 may be tuned to receiving different frequency bands of the ambient RF energy 118.

Figure 5:
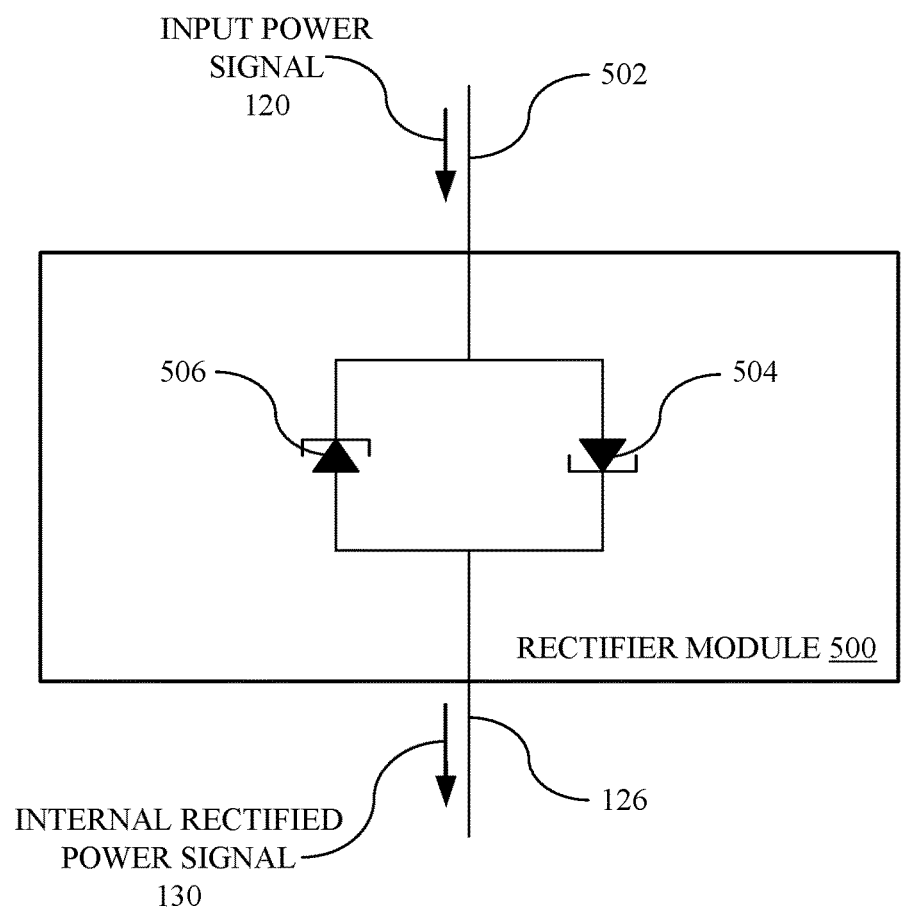
FIG. 5 is a system block diagram of the rectifier module, shown in FIGS. 1 through 3, in accordance with the present disclosure.

Turning to FIG. 5, a system block diagram of the rectifier module 500 is shown in accordance with the present disclosure. In this example, the rectifier module 500 is in signal communication with the storage module 124, via signal path 126, and the phased array antenna 102 or the duplexer 304 via signal path 502, wherein the signal path 502 corresponds to the signal path 108 (if no duplexer 304 is present) or the signal path 310 if the duplexer 304 is present.

In this example, the rectified module 500 includes at least two diodes 504 and 506. Based on the predetermined power levels of the received input power signal 120 corresponding to the ambient RF energy 118 that impinges on the RFHS (either 100, 200, or 300), the diodes 504 and 506 may each be, for example, two Schottky diodes, two tunnel diodes, or two quantum tunnel diodes. For this example, the two diodes 504 and 506 are shown to be two quantum tunnel diodes 504 and 506 because by utilizing the two quantum tunnel diodes 504 and 506, the RFHS (either 100, 200, or 300) is capable of receiving ultra-low level ambient RF energy 118 of −24 dBm and, in response, produce the internal rectified power signal 130. Furthermore, in this example, the first quantum tunnel diode 504 is shown to be forward biased and the second quantum tunnel diode 506 is shown to be reversed biased.

Quantum tunnel diodes 504 and 506 are near zero bias millimeter wave Sb-heterostructure-based backward diodes ("Sb-HBDs") having near zero turn-on voltage, which allows the quantum tunnel diodes 504 and 506 to rectify the received input power signal 120 even when the received input power signal 120 is a ultra-low RF power signal in the order of micro-watts, nano-watts, nano-watts, and pico-watts. The resulting internal rectified power signal 130 is then captured and stored in the storage module 124. In this example, the Sb-HBDs are based on quantum tunneling in an InAs/AlSb/GaSb nanostructure based on epitaxial layers of the InAs/AlSb/GaSb family of nearly-lattice matched III-V semiconductors as described in: "Sb-Heterostructure Interband Backward Diodes," by J. N. Schulman & D. H. Chow, IEEE Electron Device Letters, Vol. 21, No. 7, July 2000; "Quantum Tunneling Sb-Heterostructure Millimeter-Wave Diodes," by J. N. Schulman, E. T. Croke, D. H. Chow, H. L. Dunlap, K. S. Holabrid, M. A. Morgan, & S. Weinreb, IEEE Electron Device Meeting, 2001, IEDM '01, pp 35.1.1-35.1.3, December 2001; and "High-Performance Antimonide-Based Heterostructure Backward Diodes for Millimeter-Wave Detection," by J. N. Schulman, S. Thomas, III, D. H. Chow, Y. K. Boegeman, & K. S. Holabird, IEEE Electron Device Letters, Vol. 23, No. 10, pp 585-587, October 2002, all of which are incorporated by reference.

Figure 6A:
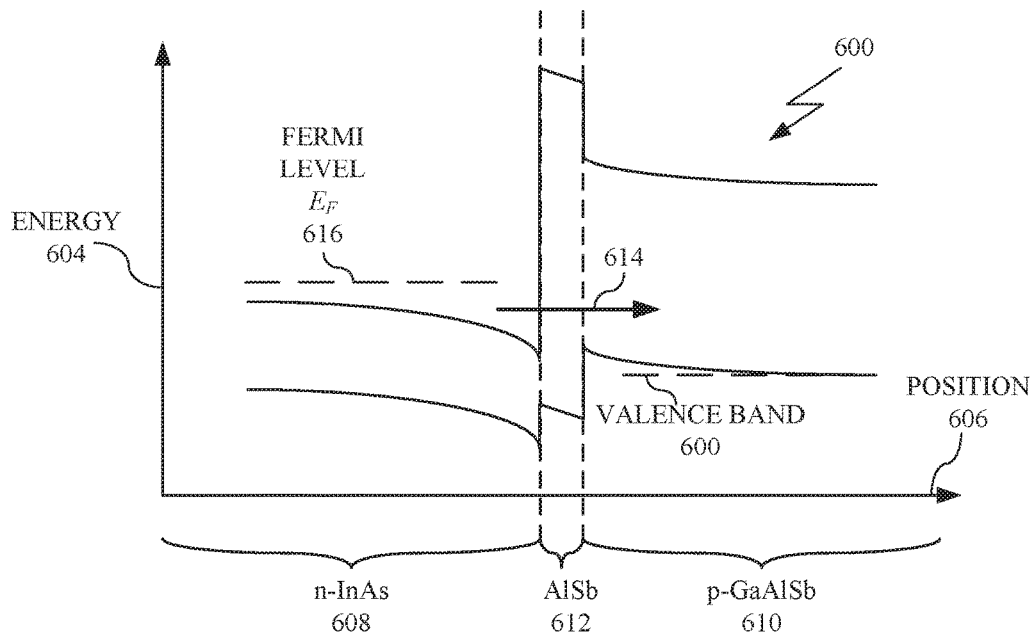
FIG. 6A is schematic plot of an example of an implementation of an energy band diagram of a quantum tunnel diode in forward bias in accordance with the present disclosure.
Figure 6B:
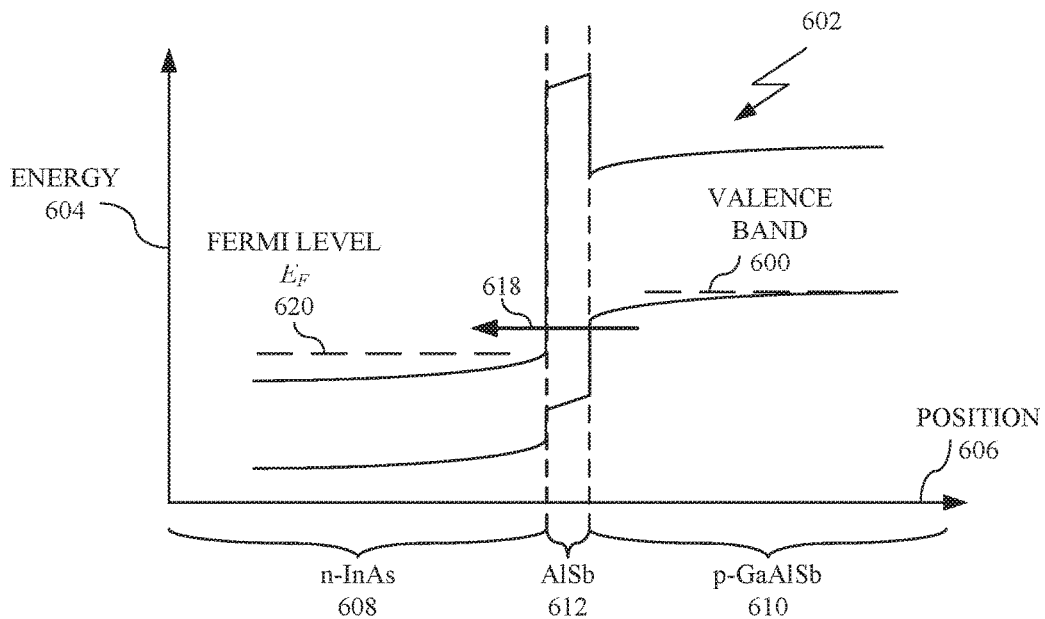
FIG. 6B is schematic plot of an example of an implementation of an energy band diagram of a quantum tunnel diode in reverse bias in accordance with the present disclosure.

In general, heterojunctions are classified into three types (straddling or type-I heterojunction, staggered or type-II heterojunction, and broken-gap or type-III heterojunction) depending on their band-alignments. The Sb-HBD diodes encompass all of the three possible band-alignments as shown in FIGS. 6A and 6B, which are schematic plots of the energy band diagrams 600 and 602 that correspond to the material structure of a typical Sb-HBD as measured in energy (in electron volts ("eV")) 604 versus position (in nanometers) 606. In this example, the left-side of the energy band diagrams 600 and 602 represents the position of n-InAs layer 608 of material on the Sb-HBD and the right-side of the energy band diagrams 600 and 602 represents the position of the p-GaAlSb layer 610 of material on the Sb-HBD. Additionally, the middle portion of the energy band diagrams 600 and 602 represents the position of the AlSb layer 612 of material on the Sb-HBD. In this example, the energy band diagram 600 represents the first quantum tunnel diode 504 in a forward bias 614 having a first Fermi energy level ("$E_F$") 616, while the energy band diagram 602 represents the second quantum tunnel diode 506 in a reverse bias 618 having a second $E_F$ 620. In these examples, the junctions are from band offset and not high doping of material layers so as to provide near-zero turn-on voltages.

Figure 7:
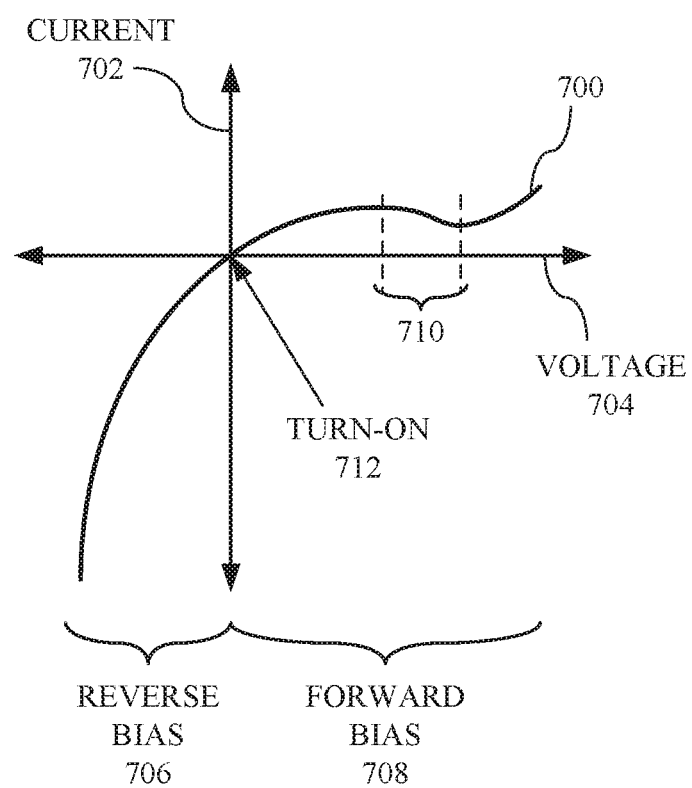
FIG. 7 is a graph of a current-voltage characteristic plot of a quantum tunnel diode in accordance with the present disclosure.

Turning to FIG. 7, a graph of a current-voltage characteristic plot 700 of a Sb-HBD is shown in accordance with the present disclosure. The graph includes a vertical axis 702 representing current and a horizontal axis 704 representing voltage. The left-side 706 of the plot 700 represents the forward bias of the Sb-HBD and the right-side 708 of the plot 700 represents the reverse bias of the Sb-HBD. The left-side reverse bias 706 of the plot 700 shows the typical break-down voltage area of the Sb-HBD and the right-side 708 shows a forward bias current-voltage characteristic that includes the effects of quantum mechanical tunneling. These effects are shown in section 710 of the plot 700 where an increase in forward voltage results in a decrease of forward current. This section 710 is generally known as the negative resistance area 710 of the Sb-HBD. Once the forward voltage is increased beyond this negative resistance area 710, the forward current begins to again correspondingly increase with increased applied forward voltage. The negative resistance effect of the Sb-HBD is similar to the same effect in normal tunnel diodes (also known as Esaki diodes). In this example, the turn-on voltage 712 is shown to be near-zero.

Figure 8:
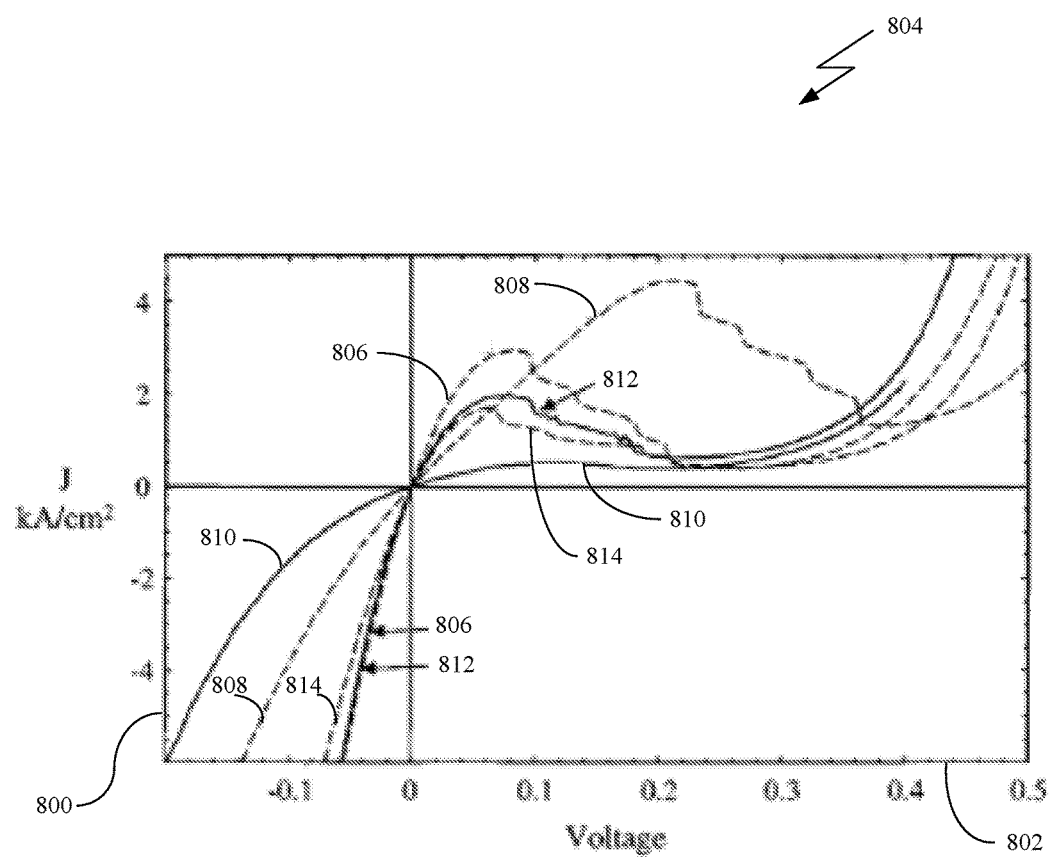
FIG. 8 is a graph of a current-density versus voltage characteristic plot of turn-on values for the example quantum tunnel diode shown in FIGS. 6A, 6B, and 7 in accordance with the present disclosure.

Turning to FIG. 8, a graph of a current-density 800 (in kA/cm$^2$) versus voltage 802 (in millivolts) characteristic plot 804 of turn-on values for the example quantum tunnel diode (shown and described in FIGS. 6A, 6B, and 7) is shown in accordance with the present disclosure. The characteristic plot 804 illustrates that the turn-on of the quantum tunnel diode occurs in sub-millivolt values of voltage 802 and the current density peaks at the first peak value. The following table shows some example peak voltage and corresponding valley voltage values. It is appreciated that compared to the presently disclosed quantum tunnel diode, typical Schottky diodes have turn-on voltage levels or about 0.4 volts to 0.5 volts. In this example, plots 806, 808, 810, and 812 are examples of Sb-based heterostructure interband backward diodes (i.e., quantum tunnel diodes), while plot 814 is an example of a Ge diode.

TABLE

| I-V characteristics of Sb-based backward diodes and a Ge diode | | | | | | |
|---|---|---|---|---|---|---|
| Sample | $N_D$ (cm$^{-1}$) | x (% Al) | $V_p$ (volt) | $V_v$ (volt) | $J_p$ (A/cm2) | $r_j$ (Ω) | γ (1/volt) |
| 806 | 7 × 10$^{17}$ | 0 | 0.085 | 0.260 | 2930 | 13.0 | 14.4 |
| 808 | 5 × 10$^{18}$ | 0 | 0.210 | 0.380 | 4460 | 34.5 | 4.30 |
| 810 | 2 × 10$^{18}$ | 20, 0 | 0.115 | 0.205 | 505 | 113 | 10.9 |
| 812 | 7 × 10$^{17}$ | 10, 0 | 0.070 | 0.230 | 1980 | 15.7 | 19.1 |
| 814 | | | 0.065 | 0.245 | 172 | 182 | 15.9 |

Figure 9:
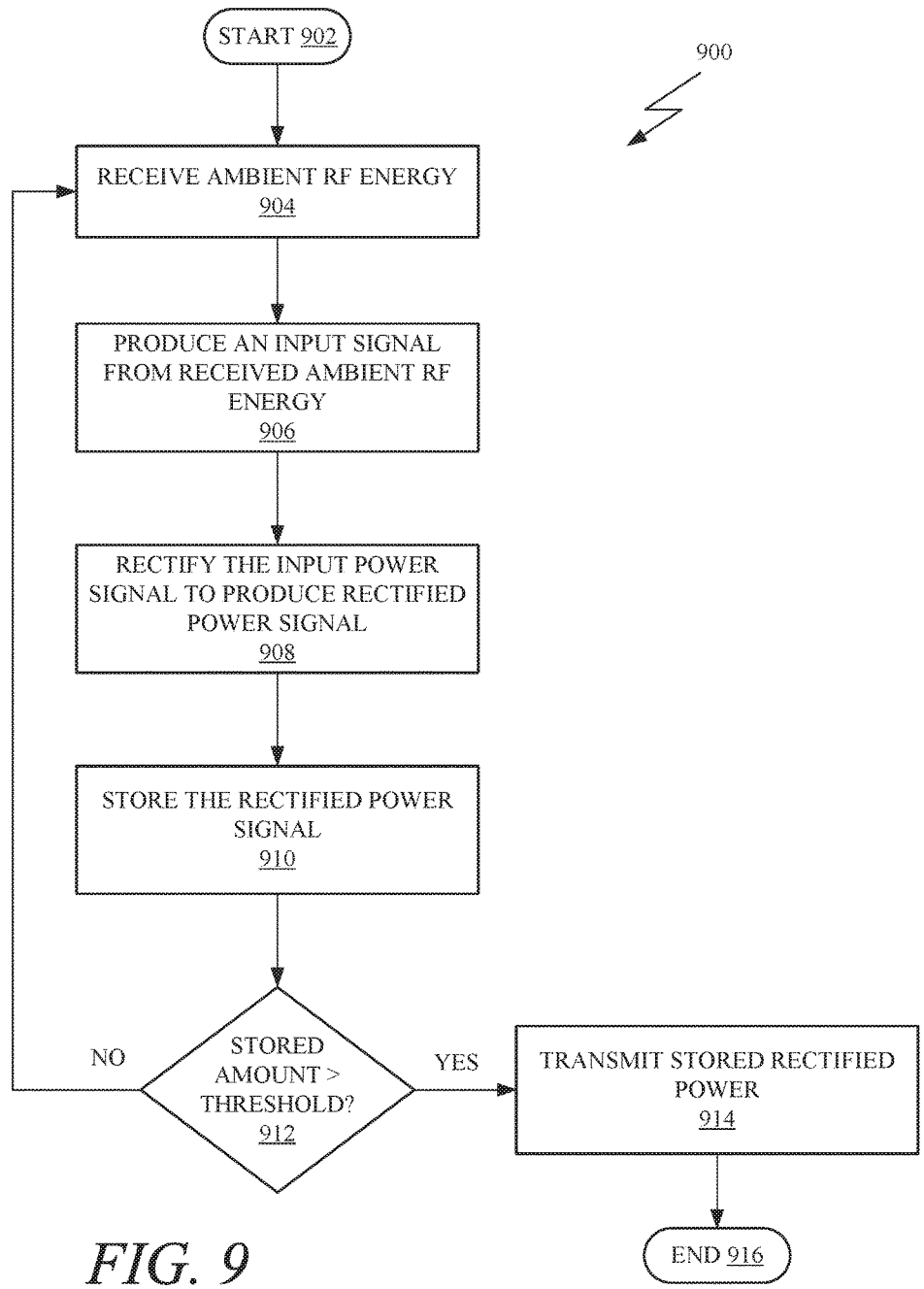
FIG. 9 is a flowchart of an example of an implementation of a method for harvesting ambient RF energy with the RFHS in accordance with the present disclosure.

In FIG. 9, a flowchart 900 is shown of an example of an implementation of method for harvesting ambient RF energy 118 with the RFHS (100, 200, or 300) in accordance with the present disclosure. The method starts 902 by receiving ambient RF energy with the phased array antenna 102, 302, or 400 in step 904. In step 906, the phased array antenna produces an input power signal in response to receiving the ambient RF energy 118 and passes it to the rectifier module 122. The rectifying module 122 then rectifies the input power signal to produce an internal rectified power signal 130, in step 908, and the passes the internal rectified power signal 130 to the storage module 124. The storage module 124 then, in step 910, stores the internal rectified power signal 130 in a storage module to create a corresponding amount of stored electrical potential energy within the storage module 124. The power threshold module 204 then determines, in decision step 912, whether the amount of stored electrical potential energy within the storage module 124 is greater than a predetermined threshold value. If the stored electrical potential energy within the storage module 124 is less than the predetermined threshold value, the process returns to step 904 and RFHS (100, 200, or 300) continues to charge receive ambient RF energy 118 and charge the storage module 124 and the process repeats between steps 904 and 912. If, instead, the stored electrical potential energy within the storage module 124 is equal to or greater than the predetermined threshold value, the process continues to step 914 where the PHU 202 transmits the rectified power signal 128 to other devices. The process then ends 916.

It will be understood that various aspects or details of the implementations may be changed without departing from the scope of the invention. It is not exhaustive and does not limit the claimed inventions to the precise form disclosed.

Furthermore, the foregoing description is for the purpose of illustration only, and not for the purpose of limitation. Modifications and variations are possible in light of the above description or may be acquired from practicing the invention. The claims and their equivalents define the scope of the invention.

What is claimed is:

1. A Radio Frequency ("RF") Energy Harvesting System ("RFHS") comprising:
 a phased array antenna, wherein the phased array antenna is configured to receive ambient RF energy and, in response, produce an input power signal;
 a power harvesting unit ("PHU") in signal communication with the phased array antenna, wherein the PHU includes
  a rectifier module in signal communication with the phased array antenna and
  a storage module in signal communication with the rectifier module,
 wherein the PHU is configured to receive the input power signal and, in response, produce a rectified power signal; and
 a controller in signal communication with the phased array antenna, wherein the controller is configured to steer an antenna beam of the phased array antenna to increase the received ambient RF energy.

2. The RFHS of claim 1, wherein the controller includes a processor in signal communication with the phased array antenna.

3. The RFHS of claim 2, wherein the controller further includes a software module.

4. The RFHS of claim 3, wherein the PHU further includes a power threshold module in signal communication with the storage module.

5. The RFHS of claim 3, wherein the phased array antenna includes:
 a plurality of antenna elements;
 a plurality of phase shifters; and
 a combiner network, wherein the processor is in signal communication with the combiner network and the plurality of phase shifters.

6. The RFHS of claim 5, wherein the rectifier module includes at least two quantum tunnel diodes.

7. The RFHS of claim 6, further including:
 a sensor in signal communication with the controller;
 a second antenna; and
 a transmitter in signal communication with the sensor, second antenna and the controller.

8. The RFHS of claim 7, further including:
 a transmitter threshold module in signal communication with both the transmitter and controller;
 an external queue threshold module; and
 wherein the transmitter is a transceiver and the external queue threshold module is in signal communication with the controller and the transceiver.

9. The RFHS of claim 5, further including:
 a sensor in signal communication with the controller;
 a duplexer in signal communication with the phased array antenna; and
 a transmitter in signal communication with the sensor, duplexer and the controller.

10. The RFHS of claim 9, further including a transmitter threshold module in signal communication with both the transmitter and controller.

11. The RFHS of claim 10, further including:
an external queue threshold module; and
wherein the transmitter is a transceiver and the external queue threshold module is in signal communication with the controller and transceiver.

12. The RFHS of claim 1, wherein the storage module is a battery or capacitor.

13. A Radio Frequency Energy Harvesting System ("RFHS") comprising:
a phased array antenna, wherein the phased array antenna is configured to receive ambient radio Frequency ("RF") energy and, in response, produce an input power signal; and
at least two quantum tunnel diodes in signal communication with the phased array antenna,
wherein the at least two quantum tunnel diodes are configured to receive the input power signal and, in response, produce a rectified power signal.

14. The RFHS of claim 13, further including:
a storage module in signal communication with the at least two quantum tunnel diodes;
a power threshold module in signal communication with the storage module; and
a controller in signal communication with the power threshold module and antenna array.

15. A method for harvesting ambient Radio Frequency ("RF") energy with an RF Energy Harvesting System ("RFHS"), the method comprising:
receiving ambient RF energy with an phased array antenna;
producing an input power signal with the phased array antenna in response to receiving the ambient RF energy;
rectifying the input power signal with a rectifier module to produce a rectified power signal;
storing the rectified power signal in a storage module to create a corresponding amount of stored electrical potential energy within the storage module in signal communication with the rectifier module; and
transmitting a stored rectified power signal from the storage module.

16. The method of claim 15, further including:
determining an antenna beam of the phased array antenna that is to be steered with a controller, in signal communication with the phased array antenna and power threshold module, based on the amount of stored electrical potential energy within the storage module; and
steering the antenna beam with the controller,
wherein the controller determines that the phased array antenna is to be steered, when steering the antenna beam results in the phased array antenna receiving a greater amount of ambient RF energy.

17. The method of claim 16, wherein rectifying the input power signal with a rectifier module to produce a rectified power signal includes rectifying the input power signal with at least two quantum tunnel diodes.

18. The method of claim 17, wherein storing the rectified power signal in a storage module includes storing the rectified power signal in a battery or capacitor.

19. The method of claim 18, further including transmitting sensor data from the sensor with a transmitter.

20. The method of claim 19, further including
determining whether the amount of stored electrical potential energy within the storage module is greater than a first predetermined threshold value with a power threshold module in signal communication with the storage module,
transmitting a stored rectified power signal to a sensor, when the amount of stored electrical potential energy within the storage module is greater than or equal to a predetermined threshold value,
determining whether the amount of stored electrical potential energy within the storage module is greater than a second predetermined threshold value with a transmitter threshold module in signal communication with the storage module,
wherein the transmitting sensor data from the sensor with the transmitter includes transmitting sensor data from the sensor with the transmitter, when the amount of stored electrical potential energy within the storage module is greater than the second predetermined threshold value.

* * * * *